(12) United States Patent
Wessling et al.

(10) Patent No.: US 9,067,180 B2
(45) Date of Patent: Jun. 30, 2015

(54) HOLLOW FIBRE MEMBRANE

(75) Inventors: Matthias Wessling, Enschede (NL); Dimitrios Stamatialis, Enschede (NL); Karina Katarzyna Kopec, Enschede (NL); Szymon Maria Dutczak, Steinfurt (DE)

(73) Assignees: Stichting voor de Technische Wetenschappen, Utrecht (NL); Universiteit Twente, Enschede (NL)

( * ) Notice: Subject to any disclaimer, the term of this patent is extended or adjusted under 35 U.S.C. 154(b) by 324 days.

(21) Appl. No.: 13/582,949

(22) PCT Filed: Mar. 4, 2011

(86) PCT No.: PCT/NL2011/050151
§ 371 (c)(1),
(2), (4) Date: Apr. 16, 2013

(87) PCT Pub. No.: WO2011/108929
PCT Pub. Date: Sep. 9, 2011

(65) Prior Publication Data
US 2013/0192459 A1 Aug. 1, 2013

(30) Foreign Application Priority Data

Mar. 5, 2010 (EP) .................................... 10155639

(51) Int. Cl.
*B01D 69/12* (2006.01)
*B01D 53/22* (2006.01)
*B01D 69/08* (2006.01)
*B01D 71/60* (2006.01)
*D01D 5/24* (2006.01)

(52) U.S. Cl.
CPC ............ *B01D 69/125* (2013.01); *B01D 69/088* (2013.01); *B01D 69/12* (2013.01); *B01D 71/60* (2013.01); *D01D 5/24* (2013.01)

(58) Field of Classification Search
CPC ...... B01D 53/22; B01D 69/088; B01D 69/12; B01D 69/125; B01D 71/60; B01D 71/64; B01D 71/68; B01D 71/80; D01D 5/24

USPC ................. 95/45; 96/8, 10, 11; 210/640, 650, 210/500.23; 264/13
See application file for complete search history.

(56) References Cited

U.S. PATENT DOCUMENTS 5,762,798 A * 6/1998 Wenthold et al. ......... 210/500.23
2006/0249018 A1 * 11/2006 Wang et al. ...................... 95/45
(Continued)

FOREIGN PATENT DOCUMENTS

EP    0 419 007 A1    3/1991
EP    1 710 011 A1    10/2006
(Continued)

OTHER PUBLICATIONS

International Search Report and Written Opinion for PCT/NL2011/050151—dated Sep. 29, 2011.
(Continued)

*Primary Examiner* — Jason M Greene
(74) *Attorney, Agent, or Firm* — Gilberto M. Villacorta; Sunit Talapatra; Foley & Lardner LLP

(57) ABSTRACT

The present invention relates to a process for manufacturing a hollow fibre membrane having a supporting layer and a separating layer, said process comprising:
(a) extruding a spinning composition comprising a first polymer and a solvent for the first polymer through an inner annular orifice of a hollow-fibre die;
(b) co-extruding a composition comprising an organic nucleophilic reagent and a mixtures of a solvent and a non-solvent for the first polymer, wherein the composition is either extruded through a central annular orifice of the hollow-fibre die or through an outer annular orifice of a hollow-fibre die; and
(c) passing the hollow-fibre through a coagulation bath.
The hollow fibre membrane according to the present invention can be used in gas separation processes, vapour separation processes and liquid filtration processes.

13 Claims, 2 Drawing Sheets

(56) References Cited

U.S. PATENT DOCUMENTS

2008/0234437 A1* 9/2008 Weiss et al. ............... 525/331.9
2009/0178561 A1* 7/2009 Miller et al. ................... 95/273

FOREIGN PATENT DOCUMENTS

| WO | WO-93/12868 A1 | 7/1993 |
|---|---|---|
| WO | WO-2005/082502 A1 | 9/2005 |
| WO | WO-2005/082505 A1 | 9/2005 |
| WO | WO-2007/007051 | 1/2007 |
| WO | WO-2007/125367 | 11/2007 |
| WO | WO-2008/138078 | 11/2008 |
| WO | WO-2009/088978 | 7/2009 |

OTHER PUBLICATIONS

Li, et al., "Wet spinning of integrally skinned hollow fiber membranes by a modified dual-bath coagulation method using a triple orifice spinneret", J. Membrane Sci. (1994), vol. 94, pp. 329-340.

* cited by examiner

HOLLOW FIBRE MEMBRANE

CROSS-REFERENCE TO RELATED APPLICATIONS

This application is a National Stage entry of International application no. PCT/NL2011/050151, filed Mar. 4, 2011, which claims priority to European Application No. 10155639.7 and provisional Application No. 61/310,879, both filed Mar. 5, 2010. The disclosures of all prior applications are hereby incorporated by reference in their entirety.

SUMMARY OF THE INVENTION

The present invention relates to hollow fibre membranes having a supporting layer and an inner (i.e. on the lumen-facing side of the supporting layer) or an outer separating layer and to a process for manufacturing such hollow fibre membranes. The separation layer is chemically adjoined to the supporting layer. Both the supporting layer and the separating layer are formed in a single step. The hollow fibre membrane is in particular useful for gas separation processes, vapour separation processes and liquid filtration processes.

BACKGROUND OF THE INVENTION

Multilayer hollow fibre membranes are well-known in the art. They usually consist of a supporting layer and a separation layer which can be made of different materials (asymmetric composite membranes) or of essentially the same materials (asymmetric integrally skinned membranes). In both cases, the supporting layer and separating layer posses a different morphology. However, in the case of asymmetric composite membranes, the supporting layer and the separating layer are bounded physically which is not favourable. In the case of asymmetric integrally skinned membrane, fabrication of the separating layer on the lumen side is not always possible.

WO 2005/082502, incorporated by reference, discloses a high-flux dialysis membrane having an asymmetric structure which is made by feeding a spinning solution comprising a hydrophobic polymer and a solvent through the annular orifice of a hollow fibre die, co-extruding a coagulant composition comprising a solvent, a non-solvent for the hydrophobic polymer, and a polyelectrolyte, and passing the obtained hollow fibre membrane through a coagulation bath, wherein the polyelectrolyte is precipitated on the lumen-side of the hollow fibre and becomes physically bound to the separating layer. The spinning solution may further comprise a hydrophilic polymer to increase the viscosity of the spinning solution. After formation of the hollow fibre membrane, the hydrophilic polymer may be cross-linked after formation of the hollow fibre membrane. Hence, WO 2005/082502 discloses a two-step process.

WO 2007/125367 and WO 2008/138078, both incorporated by reference, disclose multi-step processes for manufacturing asymmetric membranes made form polyimides. The process involves casting a film of a polyimide solution onto a substrate, immersing the film into a coagulation medium to form the membrane and treating the formed membrane with an amine.

WO 2009/088978, incorporated by reference, discloses a process for preparing mono-esterified polyimides and the use thereof in the manufacture of hollow fibre membranes comprising cross-linked polyimides, wherein the cross-linking step comprises contacting the mono-esterified polyimides with a cross-linking agent, preferably a diol. Hence, WO 2009/088978 discloses a two-step process.

WO 2007/007051, incorporated by reference, discloses triple-orifice and quadruple-orifice hollow fibre dies. Such dies are also known from S.-G. Li et al., J. Membrane Sci. 94, 329-340, 1994, and from WO 93/12868, both incorporated herein by reference.

It is an object of the present invention to provide a process that enables the manufacture of hollow fibre membranes having a supporting layer and an inner (i.e. on the lumen-facing side of the supporting layer) or an outer separating layer in a single step.

SUMMARY OF THE INVENTION

The present invention relates to a process for manufacturing a hollow fibre membrane having a supporting layer and a separating layer, said process comprising:
(a) extruding a spinning composition comprising a first polymer and a solvent for the first polymer through an inner annular orifice of a hollow-fibre die;
(b) co-extruding a composition comprising an organic nucleophilic reagent and a mixture of a solvent and a non-solvent for the first polymer, wherein the composition is either extruded through a central annular orifice of the hollow-fibre die or through an outer annular orifice of a hollow-fibre die; and
(c) passing the hollow-fibre through a coagulation bath

DETAILED DESCRIPTION OF THE INVENTION

Figure 1:
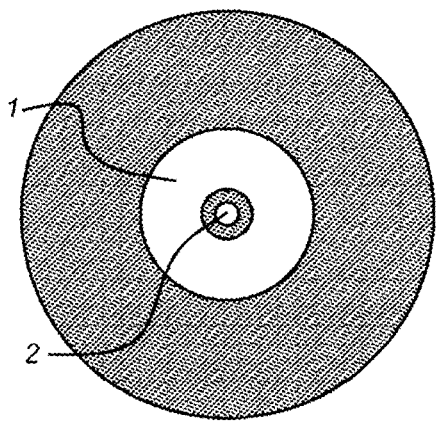
FIG. 1 shows a schematic view a double-orifice spinneret.

The verb "to comprise" as is used in this description and in the claims and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there is one and only one of the elements. The indefinite article "a" or "an" thus usually means "at least one".

The First Polymer

According to the invention, it is preferred that the first polymer is a hydrophobic polymer, preferably a thermoplastic hydrophobic polymer, wherein the hydrophobic polymer is selected from the group consisting of optionally functionalised polyethersulfones, polyimides, polyetherimides, polyamidoimides, and polyimides. These polymers are well known in the art; cf. for example Kirk-Ohtmer, Encyclopedia of Chemical Technology, Vol. 19, $4^{th}$ Ed., 691-701, 813-837, 1996, incorporated by reference herein, for polyimides and polyetherimides, and WO 2009/088978, incorporated by reference, for polyimides containing ester groups and polyetherimides containing ester groups. More preferably, the hydrophobic polymer is a polyimide or a polyetherimide. According to the invention, the first polymer may be a mixture or blend of different first polymers.

The Organic Nucleophilic Agent

The organic nucleophilic agent according to the present invention may be a lower molecular weight organic nucleophilic agent or an oligomeric or polymeric organic nucleophilic agent. The molecular weight of the organic nucleophilic agent is preferably within the range of 32 to 750.000 g/mol (hydrazine, i.e. $H_2N—NH_2$, has a molecular weight of 32 g/mol), more preferably within the range of 60 to 750.000 g/mol (ethylene diamine, i.e. $H_2N—CH_2—CH_2—NH_2$, which has a molecular weight of 60 g/mol). More preferably, the organic nucleophilic agent is an oligomeric or polymeric nucleophilic agent having a molecular weight in the range of 300 to 750,000 g/mol, wherein the organic oligomeric or polymeric nucleophilic agent comprises one or more functional groups.

According to an embodiment of the present invention, the organic nucleophilic agent preferably comprises hydroxyl and/or amino groups. The amino groups may be primary, secondary or tertiary. Suitable examples of nucleophilic agents include ethylene diamine, ethylene glycol, diethylene triamine, triethylene tetramine, tetraethylene pentamine, pentaethylene hexamine and polyethyleneimines.

The polyethyleneimine may be linear or branched and has the general formula (1):

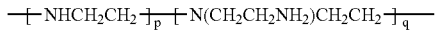

Formula (1)

wherein p+q is about 8 to about 5800 and p=8-2900. and q=0-2900. It is also preferred that the polyethyleneimine is branched wherein in the polyethyleneimine the ratio of primary amino groups:secondary amino groups:tertiary amino groups is about 1:2:1.

The polyethyleneimine may be a polyethyleneimine comprising one or more functional groups selected from the group consisting of sulfonic acid groups, phosphoric acid groups, and mixtures thereof, wherein these acid groups occur optionally in their salt form. Such polymers are known from the prior art and are for example disclosed in e.g. U.S. Pat. No. 4,639,339 and in G. Chamoulaud and D. Belanger, J. Colloid Interface Sci. 281, 179-187, 2005, both incorporated by reference.

The polyethyleneimine may also be a polyetheramine which is commercially available as Jeffamines® from Huntsman.

The polyethyleneimine may also be a hyperbranched polyethyleneimine as disclosed in Yen-Che Chiang et al., J. Membr. Sci. 326(1), 19-26, 2009, and US 2008/0163437, both incorporated by reference. Such hyperbranched polyethyleneimines are commercially available as Epomin® (weight average molecular weight range 300-70,000) from Nippon Shokubai Co., Ltd.

The polyethyleneimine may also be an alkoxylated polyethyleneimine as disclosed in US 2006/234895, incorporated by reference.

Preferably, the polyethyleneimine is according to the general formula (1).

The Solvent Composition for the First Polymer

According to the present invention, the solvent for the first polymer preferably comprises a polar aprotic solvent. Such solvents are well known in the art and include dimethylsulfoxide (DMSO), dimethylformamide (DMF), dimethylacetamide (DMA), N-methylpyrrolidone (NMP) and tetrahydrofuran (THF). The solvent for the polymer may a mixture of these polar aprotic solvents.

Preferably, the solvent comprises 60-100 wt. % of the polar aprotic solvent, more preferably 70-100 wt. %, based on the total weight of the solvent, and 0-40 wt. % of a non-solvent for the first polymer, more preferably 0-30 wt. % or less, based on the total weight of the solvent.

The Non-solvent for the First Polymer

According to the present invention, the non-solvent for the first polymer preferably comprises a protic solvent. Such solvents are also well known in the art and include water, $C_1$-$C_6$ alkanols (e.g. ethanol), $C_2$-$C_6$ alkanediols (e.g. ethylene glycol), $C_3$-$C_{12}$ alkanetriols (e.g. glycerol), $C_4$-$C_{20}$ polyols (e.g. pentaerythritol, ditrimethylolpropane, diglycerol, ditrimethylolethane, trimethylolethane, trimethylolpropane, trimethylolbutane, pentaerthyritol, dipentaerthyritol, tripentaerythritol and sorbitol), hydrophilic, preferably water soluble, polymers or copolymers such as polyalkylene polyols and polyvinylpyrrollidone. The non-solvent can be a mixture of non-solvents.

Preferred polyalkylene polyols are derived from $C_2$-$C_4$ alkylene glycol and they are selected from the group consisting of polyethylene glycol (PEG), polypropylene glycol (PPO), EO-PO diblock polymers, EO-PO triblock polymers, mixed poly(ethylene-propylene glycol) polymers and mixed poly(ethylene-butylene glycol)polymers. A more preferred hydrophilic polymer or copolymer of a $C_2$-$C_4$ alkylene glycol is a hydrophilic polymer having a number average molecular weight of 200 to 5000, more preferably 400 to 3000, especially 400 to 2000. Most preferably, the hydrophilic block is a PEG. Exemplary hydrophilic blocks are $PEG_{200}$, $PEG_{400}$, $PEG_{600}$, $PEG_{1000}$, and $PEG_{1450}$.

Preferably, the non-solvent comprises 60-100 wt. % of the protic solvent, more preferably 70-100 wt. %, based on the total weight of the non-solvent, and 0-40 wt. % of a solvent for the first polymer, more preferably 0-30 wt. % or less, based on the total weight of the non-solvent.

According to the invention, it is also preferred that the non-solvent for the polymer is miscible with the solvent for the polymer.

The Process

The process according to the present invention is based on liquid-induced phase-separation. Generally, in such a process, a polymer solution and a non-solvent, preferably a non-solvent which is miscible with the solvent for the polymer, are co-extruded through a multi-orifice die and upon contact between the polymer solution and the non-solvent, the solvent is driven out of the polymer phase and at a certain non-solvent concentration the polymer becomes solid.

The process according to the present invention can be performed by using different spinnerets, i.e. a double-orifice spinneret, a triple-orifice spinneret or a quadruple-orifice spinneret. Such spinnerets are known in the art and are disclosed in e.g. WO 93/12868 and WO 2007/007051, incorporated by reference. In a double-orifice spinneret, a polymer solution is usually extruded through outer annular orifices whereas a non-solvent is extruded through the central annular orifice. According to the process of the present invention, employing a double-orifice spinneret enables the production of hollow fibre membranes having an outer supporting layer and an inner separating layer, wherein the material of the separating layer is different from the material which makes up the supporting layer. In a triple-orifice spinneret, a polymer solution is extruded through an intermediate orifice whereas a non-solvent is extruded through the central annular orifice and/or through the outer annular orifice, preferably the outer annular orifice. The use of such a spinneret enables the production of hollow fibre membranes having an inner supporting layer and an outer separating layer, wherein the material of the separating layer is different from the material which makes up the supporting layer. Quadruple-orifice spinnerets likewise enable the production of triple-layer hollow fibre membranes.

According to a first embodiment of the present invention, the spinning composition comprises the first polymer and a solvent for the first polymer whereas the composition comprising the organic nucleophilic agent comprises a non-solvent for the first polymer.

According to a second embodiment of the present invention, the spinning composition comprises the first polymer, a solvent for the first polymer and a non-solvent for the first polymer whereas the composition comprising the nucleophilic agent comprises a non-solvent for the first polymer. In this second embodiment of the invention, the solvent system for the first polymer comprises 60-99.9 wt. % of the solvent for the first polymer, more preferably 70-99.9 wt. %, based on the total weight of the solvent, and 0.1-40 wt. % of the non-solvent for the first polymer, more preferably 0.1-30 wt. %, based on the total weight of the solvent.

According to a third embodiment of the present invention, the spinning composition comprises the first polymer, a solvent for the first polymer and a non-solvent for the first polymer whereas the composition comprising the organic nucleophilic agent comprises a solvent and a non-solvent for the first polymer. In this third embodiment of the invention, the solvent system for the first polymer preferably comprises 60-99.9 wt. % of the solvent for the first polymer, more preferably 70-99.9 wt. %, based on the total weight of the solvent, and 0.1-40 wt. % of the non-solvent for the first polymer, more preferably 0.1-30 wt. %, based on the total weight of the solvent system. The solvent system for the composition comprising the organic nucleophilic agent preferably comprises 60-99.9 wt. % of the solvent for the first polymer, more preferably 70-99.9 wt. %, based on the total weight of the solvent system, and 0.1-40 wt. % of the non-solvent for the first polymer, more preferably 0.1-30 wt. %, based on the total weight of the solvent system.

According to a fourth embodiment of the present invention, the spinning composition comprises the first polymer and a solvent for the first polymer whereas the composition comprising the organic nucleophilic agent comprises a solvent and a non-solvent for the first polymer. The solvent system for the composition comprising the organic nucleophilic agent preferably comprises 60-99.9 wt. % of the solvent for the first polymer, more preferably 70-99.9 wt. %, based on the total weight of the solvent system, and 0.1-40 wt. % of the non-solvent for the first polymer, more preferably 0.1-30 wt. %, based on the total weight of the solvent system.

According to a fifth embodiment of the present invention, the spinning composition may further comprise an organic nucleophilic agent, wherein the composition may optionally be devoid of the organic nucleophilic agent.

Accordingly, the present invention encompasses the following options wherein phase (1) and phase (2) comprise the indicated essential components:

Phase (1): first polymer+solvent for first polymer; phase (2): organic nucleophilic agent+non-solvent for the first polymer.

Phase (1): first polymer+solvent for first polymer+non-solvent for the first polymer; phase (2): organic nucleophilic agent+non-solvent for the first polymer.

Phase (1): first polymer+solvent for first polymer; phase (2): organic nucleophilic agent+solvent for the first polymer+non-solvent for the first polymer.

Phase (1): first polymer+solvent for first polymer+non-solvent for the first polymer; phase (2): organic nucleophilic agent+solvent for the first polymer+non-solvent for the first polymer.

Phase (1): first polymer+solvent for first polymer+organic nucleophilic agent; phase (2): non-solvent for the first polymer.

Phase (1): first polymer+solvent for first polymer+non-solvent for first polymer+organic nucleophilic agent; phase (2): non-solvent for the first polymer.

Phase (1): first polymer+solvent for first polymer+non-solvent for first polymer+organic nucleophilic agent; phase (2): solvent for first polymer+non-solvent for the first polymer.

Phase (1): first polymer+solvent for first polymer+non-solvent for first polymer+organic nucleophilic agent; phase (2): organic nucleophilic agent+non-solvent for the first polymer.

Phase (1): first polymer+solvent for first polymer+non-solvent for first polymer+organic nucleophilic agent; phase (2): organic nucleophilic agent+solvent for first polymer+non-solvent for the first polymer.

A double-orifice spinneret is schematically shown in FIG. 1. When the process according to the present invention is carried out with a double-orifice spinneret, the phase (1) composition is extruded through the outer annular orifice 1 whereas the phase (2) composition is co-extruded through the central annular orifice 2.

Figure 2:
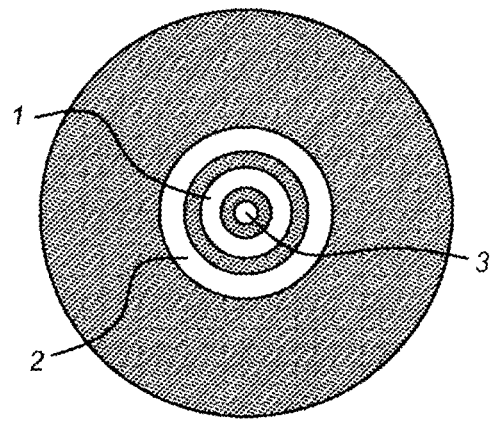
FIG. 2 shows a schematic view a triple-orifice spinneret.

A triple-orifice spinneret is schematically shown in FIG. 2. When the process according to the present invention is carried out with a triple-orifice spinneret, the phase (1) composition is extruded through the intermediate annular orifice 1 whereas the phase (2) composition is co-extruded through the outer annular orifice 2. A non-solvent is co-extruded through the central annular orifice 3. Alternatively, the phase (1) composition is extruded through the intermediate annular orifice 1 whereas the phase (2) composition is co-extruded through the central annular orifice 3 and a non-solvent is then co-extruded through the outer central annular orifice 2. According to this embodiment, an inert gas, a vapour or an inert liquid may be co-extruded through central annular orifice 3 instead of a phase (2) composition.

In the art, the phases extruded through the central orifices are often referred to as "bore liquid", whereas the phase extruded through an outer orifice are often referred to as "shell liquid".

Other process parameters include the temperature of the phase (1) and phase (2) compositions, the temperature of the gas, vapour or inert liquid when used, the pulling speed with which the hollow fibre is drawn, the temperature of the coagulation bath, the concentration of the first polymer in the phase (1) composition and the like.

According to a preferred embodiment of the present invention, the phase (2) composition comprises 1%-30% by weight of the nucleophilic agent and 70%-99% by weight of solvent phase, based on the total weight of the phase (2) composition, wherein this solvent phase comprises 1%-99% wt. of protic solvent and 1%-99% by weight of polar, aprotic solvent, based on the total weight of the solvent phase. More preferably, the solvent phase comprises 10%-90% wt. of protic solvent and 10%-90% by weight of polar, aprotic solvent. Most preferably, the protic solvent is water and/or polyethylene glycol and the solvent is NMP.

The hollow fibre membrane according to the present invention is in particular useful for gas separation processes, vapour separation processes and liquid filtration processes.

EXAMPLE 1

Figure 3:
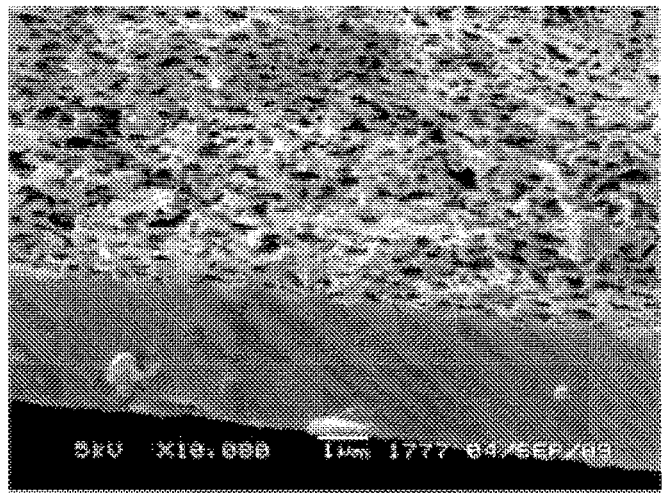
FIG. 3 shows a cross-sectional view of the hollow fiber according to Example 1.

A viscous solution of 22 wt % Lenzing P84 polyimide (HP polymers GmbH, Austria), 12 wt % glycerol and 66 wt % N-methyl pyrrolidone (NMP) was stirred continuously at 50° C. for 24 hours to obtain a homogeneous solution. The polymer solution was filtered through 25 μm mesh metal filter and afterwards allowed to stand for another 48 hours at room temperature to remove air bubbles. The polymer solution was extruded through the outer annular orifice of the double spinneret at the flow rate 3.1 ml/min, while the bore liquid comprising of 20 wt % polyethyleneimine (PEI) MW 25,000, 70 wt % NMP and 10 wt % water was simultaneously pumped through the centre orifice at the flow rate 1.8 ml/min. The spinneret dimensions were i.d. 0.8 mm o.d. 1.5 mm. The fibre was pulled at the speed of 8.7 m/min, first passing 5 cm air gap and subsequently the coagulation bath containing pure water. Fibres were then steeped in water for 2 days to remove the residual NMP, retrieved, and placed in ethanol for a further day. The hollow fibre membranes were then dried in air at ambient temperature. FIG. 3 shows a cross-section of the hollow fibre from Example 1 showing the bore side.

EXAMPLE 2

Figure 4:
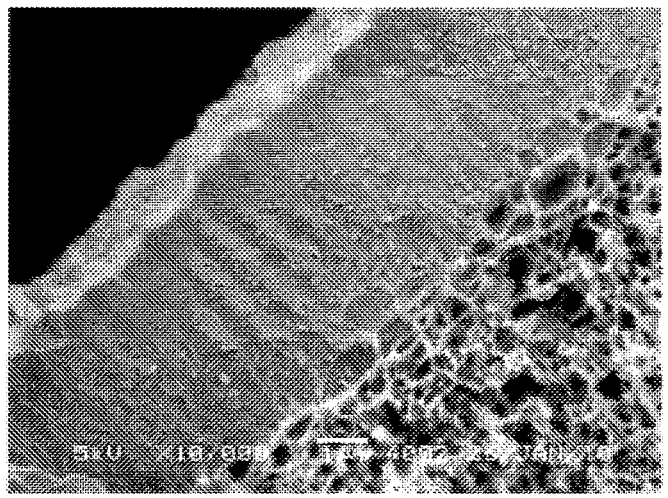
FIG. 4 shows a cross-sectional view of the hollow fiber according to Example 2.

A viscous solution of 30 wt % Lenzing P84 polyimide (HP polymers GmbH, Austria), 70 wt % N-methyl pyrrolidone (NMP) was stirred continuously at 50° C. for 24 hours to obtain a homogeneous solution. The polymer solution was filtered through 25 μm mesh metal filter and afterwards allowed to stand for another 48 hours at room temperature to remove air bubbles. The polymer solution was extruded through the outer annular orifice of the double spinneret at the flow rate 3.1 ml/min, while the bore liquid comprising of 10 wt % PEI MW 25,000, 79 wt % NMP and 11 wt % water was simultaneously pumped through the centre orifice at the flow rate 1.8 ml/min. The spinneret dimensions were i.d. 0.8 mm o.d. 1.5 mm. The fibre was pulled at the speed of 4.2 m/min, first passing 1 cm air gap and subsequently the coagulation bath containing pure water. Fibres were then steeped in water for 2 days to remove the residual NMP, retrieved, and placed in ethanol for a further day. The hollow fibre membranes were then dried in air at ambient temperature. FIG. 4 shows a cross-section of the hollow fibre according to Example 2 showing the bore side.

EXAMPLE 3

Figure 5:
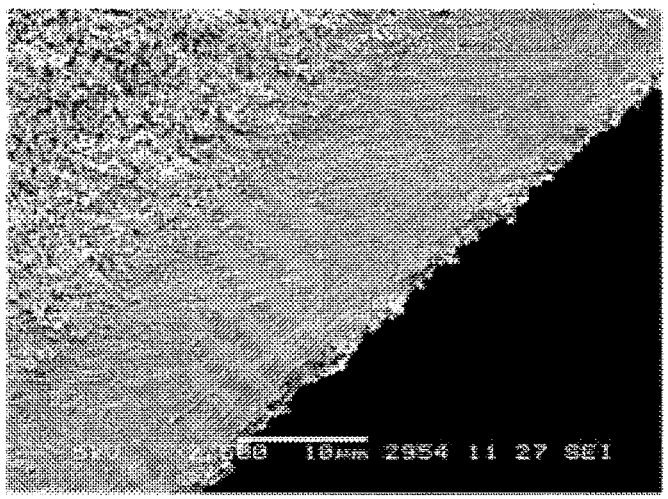
FIG. 5 shows a cross-sectional view of the hollow fiber according to Example 3.

A viscous solution of 22 wt % Leming P84 polyimide (HP polymers GmbH, Austria), 12 wt % glycerol and 66 wt % N-methyl pyrrolidone (NMP) was stirred continuously at 50° C. for 24 hours to obtain a homogeneous solution. The polymer solution was filtered through 25 μm mesh metal filter and afterwards allowed to stand for another 48 hours at room temperature to remove air bubbles. The polymer solution was extruded through the intermediate annular orifice of the triple spinneret at the flow rate 2.9 ml/min, while the bore liquid comprising of 5 wt % ethylenediamine (EDA) and 95 wt % polyethylene glycol 400 was simultaneously pumped through the centre orifice at the flow rate 1.0 ml/min. Shell liquid comprising of 75 wt % NMP and 25 wt % water was pumped through outer annular orifice at the flow rate 1.4 ml/min. The spinneret dimensions were: inner diameter 0.6 mm, intermediate diameter 1.25 mm and outer diameter 1.75 mm. The fibre was pulled at the speed of 1.7 m/min, first passing 2.5 cm air gap and subsequently the coagulation bath containing pure water. Fibres were then steeped in water for 2 days to remove the residual NMP, retrieved, and placed in ethanol for a further day. The hollow fibre membranes were then dried in air at ambient temperature. FIG. 5 shows a cross-section of the hollow fibre from Example 3 on the bore side.

The invention claimed is:

1. A process for manufacturing a hollow fibre membrane having a supporting layer and a separating layer, said process comprising:
   (a) extruding a spinning composition comprising a first polymer and a solvent for the first polymer through an inner annular orifice of a hollow-fibre die;
   (b) co-extruding a composition comprising an organic nucleophilic reagent and a mixture of a solvent and a non-solvent for the first polymer, wherein the composition is either extruded through a central annular orifice of the hollow-fibre die or through an outer annular orifice of a hollow-fibre die; and
   (c) passing the hollow-fibre through a coagulation bath, wherein:
      (1) the first polymer is a hydrophobic polymer; and
      (2) the organic nucleophilic reagent is selected from the group consisting of ethylene diamine, diethylene triamine, triethylene tetramine, tetraethylene pentamine, pentaethylene hexamine and polvethyleneimines; and
   wherein the organic nucleophilic reagent crosslinks the first polymer.

2. The process according to claim 1, wherein the hollow-fibre die is a double-orifice spinneret, a triple-orifice spinneret or a quadruple-orifice spinneret.

3. The process according to claim 1, wherein the hydrophobic polymer is a thermoplastic hydrophobic polymer.

4. The process according to claim 3, wherein the hydrophobic polymer is a polyethersulfone, a polyamidoimide, a polyimide or a polyether imide.

5. The process according to claim 4, wherein the hydrophobic polymer is a polyimide or a polyether imide.

6. The process according to claim 5, wherein the polyimide or the polyetherimide comprises ester groups.

7. The process according to claim 1, wherein the polyethyleneimine may be linear or branched and has the general formula (1):

$$\mathrm{-\!\!-\!\!\!-\!NHCH_2CH_2\!\!-\!\!\!-\!\!\!]_p\!\!-\!\!\!-\!N(CH_2CH_2NH_2)CH_2CH_2\!\!-\!\!\!-\!\!\!]_q\!\!-\!\!\!-\!\!\!-}$$

Formula (1)

wherein p+q is 8 to 5800 and p=8-2900. and q=0-2900.

8. The process according to claim 1, wherein the polyethyleneimine is branched, wherein in the polyethyleneimine the ratio of primary amino groups : secondary amino groups : tertiary amino groups is about 1 : 2 : 1.

9. The process according to claim 1, wherein the solvent for the first polymer comprises a polar aprotic solvent.

10. The process according to claim 1, wherein the non-solvent for the first polymer comprises a protic solvent.

11. A hollow fibre membrane obtainable by the process according to claim 1.

12. The hollow fibre membrane according to claim 11, wherein the separating layer is chemically adjoined to the supporting layer.

13. A method of gas separation, vapor separation and/or liquid filtration, comprising passing a gas, vapor, and/or liquid through the hollow fibre membrane according to claim 11.

* * * * *